United States Patent Office 3,280,134
Patented Oct. 18, 1966

3,280,134
17a-AZA-D-HOMOANDROSTADIENES
Vlasios Georgian, Belmont, Mass., and William J. Novick, Willingboro, N.J., assignors to Smith Kline & French Laboratories, Philadelphia, Pa., a corporation of Pennsylvania
No Drawing. Filed Dec. 9, 1965, Ser. No. 512,805
11 Claims. (Cl. 260—289)

This invention relates to azasteroids having central nervous system depressant activity. In particular, the invention relates to 17a-aza-D-homoandrostadienes, oxygenated at the 3-position and optionally alkylated or acylated at the 17a-position.

The compounds of the invention are represented by the following structural formulas:

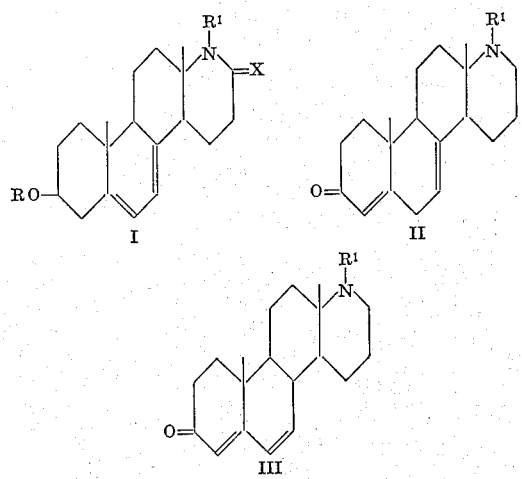

wherein:
R is hydrogen or lower acyl;
$R^1$ is hydrogen, lower alkyl, lower acyl, or benzyl; and
X is $H_2$ or, when $R^1$ is hydrogen, X may be oxygen.

For purposes of the present invention, the term "lower alkyl" is intended to represent those alkyl groups having up to about six carbon atoms therein, including methyl, ethyl, and butyl. The term "lower acyl" is intended to represent those acyl groups having up to about seven carbon atoms therein, including acetyl, propionyl, butyryl, and benzoyl.

The invention comprises 17a-aza-D-homoandrosta-5,7-dienes (Formula I), 17a-aza-D-homoandrosta-4,7-dienes (Formula II), and 17a-aza-D-homoandrosta-4,6-dienes (Formula III).

The compounds of the inventon are prepared as described below using synthetic routes illustrated by means of the following schematic chart:

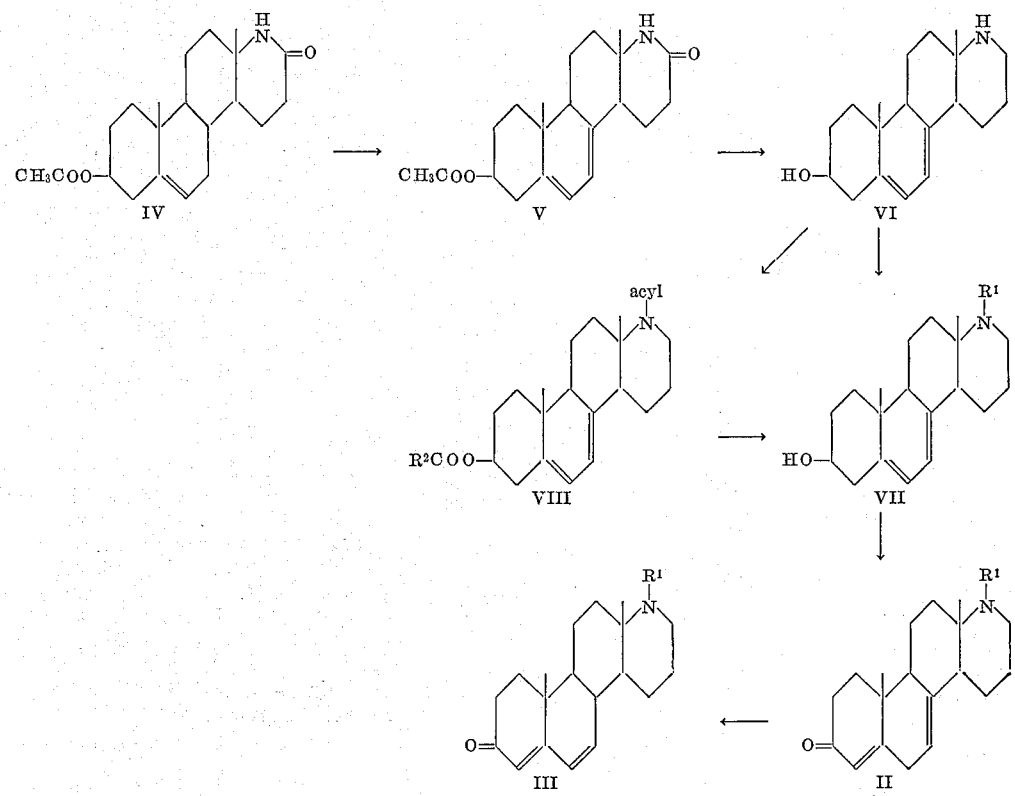

The starting material, 3β-acetoxy-17a-aza-D-homoandrost-5-en-17-one (IV) [Helv. Chim. Acta 42, 1071 (1959)], is brominated by irradiating a solution of the compound and N-bromosuccinimide in chloroform. The 5,7-diene system is generated by dehydrobromination with trimethyl phosphite in refluxing xylene. The resulting compound, 3β-acetoxy-17a-aza-D-homoandrosta-5,7-dien-17-one (V), has been found to be active in decreasing the spontaneous motor activity of mice. This test is a standard procedure which indicates the activity of a compound in depressing the central nervous system. Compound V is converted to other active compounds by methods indicated below.

The 3-acetate group may be selectively hydrolyzed by being allowed to stand at room temperature in aqueous alkali to give the 3-alcohol. The alcohol is optionally reacylated by reaction with a lower acyl halide or anhydride to give other 3-acyloxy compounds of Formula I.

The lactam carbonyl of compound V is reduced with lithium aluminum hydride in a solvent such as dioxane or tetrahydrofuran. The resulting product, the 3-acetoxy group having been simultaneously reduced, is 17a-aza-D-homoandrosta-5,7-dien-3β-ol (VI). This compound may be alkylated at the 17a-position with reagents such as lower alkyl halides or sulfates. Methylation is best accomplished by treatment with a mixture of 98% formic acid and formaldehyde solution. Acylation at the 3-position of a 17a-alkylated compound or diacylation at the 3 and 17a-positions of a 17a-unsubstituted compound is accomplished by conventional acylation methods; the 3-ester may be selectively hydrolyzed to give a 17a-acyl-3-alcohol. Compounds in which $R^1$ is alkyl are produced by reduction of the appropriate 17a-acyl compound as well as by direct alkylation. A 17a-benzyl compound is the product of reduction of a 17a-benzoyl compound with lithium aluminum hydride.

Compounds having the androsta-4,7-diene system (II) are prepared by oxidizing the 3-hydroxy group of the androsta-5,7-dienes of Formulas VI or VII, i.e., compounds both alkylated or unalkylated at the 17a-nitrogen atom, under Oppenauer conditions. With the oxidation of the 3-alcohol to a ketone, the 5–6 double bond becomes conjugated with the carbonyl double bond by isomerization to the 4–5 position. Compounds having the androsta-4,6-diene system (III) are prepared by isomerizing a compound having the androsta-4,7-diene system (II) with a strong acid. These compounds, if unsubstituted at the 17a-nitrogen atoms, may be acylated or alkylated as described above.

The basic amine compounds of the invention may be converted into their pharmaceutically acceptable acid addition salts by combination with such an acid either as such or in the form of an acetone, alcoholic, or ethereal solution thereof. Among the acids which may be used are hydrochloric, sulfuric, hydrobromic, citric, pamoic, maleic, nitric, acetic, tartaric, and succinic. These salts are the full equivalents of the basic compounds of the invention.

Also part of the invention and equivalent to the basic compounds of the invention are the quaternary ammonium salts prepared from the unacylated basic compounds of the invention and a lower alkyl halide or sulfate.

The compounds of this invention are central nervous system depressants as shown by their ability to decrease the spontaneous motor activity of mice. The compounds are administered orally or parenterally, preferably orally, at doses of 100–200 mg./kg. in the form of saline solutions of the free bases.

The following examples are intended to illustrate the preparation of the compounds of the invention, but should not be considered as limiting the scope thereof.

EXAMPLE 1

*3β-acetoxy-17a-aza-D-homoandrosta-5,7-dien-17-one*

A mixture of 3β-acetoxy-17a-aza-D-homoandrost-5-en-17-one (3.4 g.) and N-bromosuccinimide (2.2 g.) in dry chloroform (125 ml.) is irradiated and refluxed under the heat and light of a General Electric Photospot lamp for 5–10 minutes, and is then cooled immediately under cold water. This clear yellow chloroform solution is washed repeatedly with water, followed by sodium bicarbonate solution and finally with water. The organic layer is dried over sodium sulphate and evaporated under reduced pressure. The resulting gummy yellow solid residue is treated with dry benzene, and the benzene is then removed under reduced pressure to ensure complete removal of the chloroform. The yellow colored gummy solid is dissolved in xylene (180 ml.), trimethyl phosphite (20 ml.) is added, and the straw-yellow reaction solution is refluxed at 130° for 1¼ hours. The temperature is then raised slowly to 139° during fifteen minutes as excess trimethyl phosphite along with some xylene is removed during refluxing by a take-off device interposed between the flask and condenser. At the end of this period, the reaction mixture is cooled for a while, and xylene is removed under reduced pressure.

The residue is recrystallized from acetone to give the title compound, M.P. 270–2° dec. Infrared absorption (Nujol) at 3.0μ, 5.7μ, 6.0μ, 6.2μ, and 8.0μ. Ultraviolet absorption peaks at 288 mμ (ε=5500), 278 mμ (ε=9879), 268 mμ (ε=9792), and 258 mμ (ε=7235).

*Analysis.*—Calc'd. for $C_{21}H_{29}NO_3$: C, 73.44; H, 8.51; N, 4.08%. Found: C, 73.25; H, 8.42; N, 4.03%.

EXAMPLE 2

*17a-aza-D-homoandrosta-5,7-dien-3β-ol*

A solution of 6 g. of 3β-acetoxy-17a-aza-D-homoandrosta-5,7-dien-17-one in dry dioxane (400 ml.) is added to a refluxing solution of lithium aluminum hydride (2 g.) in dry dioxane (200 ml.). The mixture is refluxed for 48 hours, at the end of which period the resulting complex is decomposed cautiously with 14 ml. of water. The reaction mixture is refluxed again for an hour and filtered while hot. The residue is washed repeatedly with hot dioxane, and the filtrate and the washings are evaporated to dryness under reduced pressure. A light yellow solid residue of the title product thus obtained is crystallized from methanol, M.P. 225–27°. Infrared absorption (Nujol) at 2.8μ, 3.0μ, 6.0μ, and 6.2μ. Ultraviolet absorption peaks at 288 mμ (ε=5200), 278 mμ (ε=9300), 268 mμ (ε=9000), and 258 mμ (ε=6700).

*Analysis.*—Calc'd. for $C_{19}H_{29}NO$: C, 79.39; H, 10.17; N, 4.87%. Found: C, 79.27; H, 10.11; N, 5.09%.

EXAMPLE 3

*17a-methyl-17a-aza-D-homoandrosta-5,7-dien-3β-ol*

17a-aza-D-homoandrosta-5,7-dien-3β-ol (2 g.) is added to a mixture of formic acid (1.8 g.; 98%) and formaldehyde (1.4 g.; 40% solution).

The mixture is heated on a steam bath for 3 hours. Much evolution of gas is observed in the beginning and this subsides gradually. The color of the reaction mixture turns brown. At the end of the reaction, excess solvents are removed under low pressure. The residue, a brown colored oil, when treated with water, dissolves, and a clear solution results. On basification with aqueous sodium hydroxide solution (10%), a voluminous precipitation takes place. The filtered material is washed repeatedly with water to make it free of alkali. The residue, the title product, is dried and recrystallized from acetone, M.P. 173–74°. Infrared absorption (Nujol) at 2.8μ, 6.0μ and 6.2μ. Ultraviolet absorption peaks at 288 mμ (ε=5000), 278 mμ (ε=8980), 268 mμ (ε=8800), and 258 mμ (ε=6500).

*Analysis.*—Calc'd. for $C_{20}H_{31}NO$: C, 79.68; H, 10.36; N, 4.65%. Found: C, 79.84; H, 10.52; N, 4.63%.

EXAMPLE 4

*17a-methyl-17a-aza-D-homoandrosta-4,7-dien-3-one*

A mixture of 17a-methyl-17a-aza-D-homoandrosta-5,7-dien-3β-ol (300 mg.), freshly distilled cyclohexanone (3 ml.), and toluene (30 ml.) is boiled for 10–15 minutes to ensure proper anhydrous condition. Aluminum isopropoxide (200 mg.) is added to the hot mixture, and it is then refluxed for an hour. During refluxing, the condenser is removed from time to time. The reaction mixture is then cooled and diluted with ether. The ethereal layer is washed with aqueous sodium hydroxide solution (10%) until the aqueous layer is colorless. The organic layer is then washed with water until it is free from alkali, and the neutral organic layer is next extracted three times with dilute hydrochloric acid. The acid extract on basification with sodium hydroxide solution (10%) becomes turbid, and this suspension is extracted three times with dichloromethane. The organic layer is then washed with water, dried over sodium sulfate and evaporated to yield a thick yellow oil, which crystallizes in acetone as the title product, M.P. 124–25°. Infrared absorption at 6.0μ and 6.2μ. Ultraviolet absorption peak at 238 mμ (ε=16750).

Analysis.—Calc'd. for $C_{20}H_{29}NO$: C, 80.22; H, 9.76; N, 4.68%. Found: C, 80.15; H, 9.47; N, 4.77%.

EXAMPLE 5

*17a-methyl-17a-aza-D-homoandrosta-4,6-dien-3-one*

A solution of 250 mg. of 17a-methyl-17a-aza-D-homoandrosta-4,7-dien-3-one in 3% methanolic hydrochloric acid (75 ml.) is refluxed for 75 minutes. At the end of this period, methanol is removed under reduced pressure. The red colored oily residue is treated with water, whereupon a clear solution results. After basification with 3% sodium hydroxide solution, it is extracted with methylene chloride. The organic layer is washed with water, dried over sodium sulfate and the solvent removed under reduced pressure. The yellow colored solid residue is crystallized from acetone-hexane, M.P. 141–42°.

Infrared absorption at $5.92\mu$, $6.15\mu$, and $6.26\mu$. Ultraviolet absorption peak at 283.5 m$\mu$ ($\epsilon=26,300$).

EXAMPLE 6

*17a-aza-D-homoandrosta-4,7-dien-3-one*

A mixture of 17a-aza-D-homoandrosta-5,7-dien-3β-ol (300 mg.), 3 ml. of distilled cyclohexanone, and 30 ml. of toluene is heated as in Example 4 and then aluminum isopropoxide added. The reaction is carried out and the mixture then worked up as in Example 4 to give 17a-aza-D-homoandrosta-4,7-dien-3-one.

EXAMPLE 7

*17a-aza-D-homoandrosta-4,6-dien-3-one*

A solution of 250 mg. of 17a-aza-D-homoandrosta-4,7-dien-3-one in 75 ml. of 3% methanolic hydrochloric acid is refluxed and then worked up as in Example 5 to give 17a-aza-D-homoandrosta-4,6-dien-3-one.

EXAMPLE 8

*17a-acetyl-17a-aza-D-homoandrosta-4,7-dien-3-one*

17a-aza-D-homoandrosta-4,7-dien-3-one is acetylated by being kept with acetic anhydride in pyridine at room temperature for 18 hours and then being poured into water. The product is filtered, dried, and crystallized. Use of propionic anhydride or butyryl chloride results in the formation of the corresponding 17a-propionyl or butyryl compound.

EXAMPLE 9

*17a-acetyl-3β-acetoxy-17a-aza-D-homoandrosta-5,7-diene*

17a-aza-D-homoandrosta-5,7-dien-3β-ol is acetylated with acetic anhydride in pyridine according to the above procedure.

EXAMPLE 10

*17a-acetyl-17a-aza-D-homoandrosta-5,7-dien-3β-ol*

A solution of 2 g. of 17α-acetyl-3β-acetoxy-17α-aza-D-homoandrosta-5,7-diene in methanol containing one molar equivalent of potassium hydroxide is allowed to stand overnight at room temperature. Chloroform is then added, following which the solution is washed with dil. hydrocloric acid. The solvent is evaporated in vacuo and the residue crystallized to obtain the title product.

EXAMPLE 11

*17a-benzoyl-3β-benzoyloxy-17a-aza-D-homoandrosta-5,7-diene*

A solution of 3.0 g. of 17a-aza-D-homoandrosta-5,7-dien-3β-ol in 90 ml. of dry pyridine and 18 ml. of benzoyl chloride is heated to boiling and then allowed to stand at room temperature for 2 hours. The mixture is poured into ice water and the resulting precipitate filtered off and washed. The product is obtained by recrystallization.

EXAMPLE 12

*17a-benzyl-17a-aza-D-homoandrosta-5,7-dien-3β-ol*

To a suspension of 5 g. of lithium aluminum hydride in ethylene glycol dimethyl ether is added 1.35 g. of 17β-benzoyl - 3β - benzoyloxy - 17a - aza-D-homoandrosta-5,7-diene. The mixture is refluxed for 8 hours and the excess hydride then cautiously decomposed with aqueous potassium hydroxide. The organic layer is separated, the solvent evaporated, and the residue either crystallized to give the product or first chromatographed on silica-gel.

EXAMPLE 13

*17a-ethyl-17a-aza-D-homoandrosta-4,7-dien-3-one*

To a solution of 1 g. of 17a-aza-D-homoandrosta-4,7-dien-3-one in 30 ml. of acetone is added 0.9 g. of diethyl sulfate and a solution of 1 g. of potassium hydroxide in 3 ml. of water. The mixture is refluxed for 6 hours, evaporated in vacuo, cooled, and poured into cold water. The resulting precipitate is collected, washed, dried, and recrystallized to give the title compound.

Use of propyl iodide or butyl bromide results in the preparation of the corresponding 17a-propyl and butyl compounds.

EXAMPLE 14

*17a-methyl-17a-aza-D-homoandrosta-4,7 - dien-3-one methiodide*

To a solution of 200 mg. of 17a-methyl-17a-aza-D-homoandrosta-4,7-dien-3-one in 100 ml. of acetone is added 4 ml. of methyl iodide and the solution allowed to stand overnight. The crystalline solid that separates is filtered off and washed with cold water and then recrystallized from water, M.P. 239–41° dec.

We claim:
1. A compound of one of the following formulas:

[Structures I, II, and III shown]

wherein:
R is hydrogen or lower acyl;
$R^1$ is hydrogen, lower alkyl, lower acyl, or benzyl; and
X is $H_2$ or when $R^1$ is hydrogen, X is oxygen.

2. A compound as claimed in claim 1 in which the compound is of Formula I.
3. A compound as claimed in claim 1 in which the compound is of Formula II.
4. A compound as claimed in claim 1 in which the compound is of Formula III.
5. A compound as claimed in claim 2 in which R and $R^1$ are hydrogen and X is $H_2$.
6. A compound as claimed in claim 2 in which R is hydrogen, $R^1$ is methyl, and X is $H_2$.
7. A compound as claimed in claim 2 in which R is acetyl, $R^1$ is hydrogen, and X is oxygen.

8. A compound as claimed in claim 3 in which $R^1$ is lower alkyl or hydrogen.

9. A compound as claimed in claim 4 in which $R^1$ is lower alkyl or hydrogen.

10. A compound as claimed in claim 3 in which $R^1$ is methyl.

11. A compound as claimed in claim 4 in which $R^1$ is methyl.

References Cited by the Examiner

UNITED STATES PATENTS 2,738,350   3/1956   Mazor _____ 260—289

ALEX MAZEL, *Primary Examiner.*

DONALD G. DAUS, *Assistant Examiner.*